(12) United States Patent
Schadhauser et al.

(10) Patent No.: US 11,639,016 B2
(45) Date of Patent: May 2, 2023

(54) SHEARING PART

(71) Applicant: KRAUSSMAFFEI TECHNOLOGIES GMBH, Munich (DE)

(72) Inventors: Maximilian Schadhauser, Unterhaching (DE); Martin Würtele, Friedberg (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 388 days.

(21) Appl. No.: 16/651,436

(22) PCT Filed: Sep. 18, 2018

(86) PCT No.: PCT/EP2018/075144
§ 371 (c)(1),
(2) Date: Mar. 27, 2020

(87) PCT Pub. No.: WO2019/076561
PCT Pub. Date: Apr. 25, 2019

(65) Prior Publication Data
US 2020/0298458 A1 Sep. 24, 2020

(30) Foreign Application Priority Data
Oct. 17, 2017 (DE) .......................... 102017124091.8

(51) Int. Cl.
*B29C 48/03* (2019.01)
*B29C 48/56* (2019.01)
(Continued)

(52) U.S. Cl.
CPC .............. *B29C 48/03* (2019.02); *B29C 48/56* (2019.02); *B29C 48/397* (2019.02); *B29C 48/68* (2019.02); *B29K 2105/12* (2013.01)

(58) Field of Classification Search
CPC ..... B29C 48/56; B29C 48/67; B29C 48/2552; B29C 48/575; B29B 7/421
See application file for complete search history.

(56) References Cited

U.S. PATENT DOCUMENTS

| 4,128,341 A | 12/1978 | Hsu |
| 5,035,509 A | 7/1991 | Kruder |

(Continued)

FOREIGN PATENT DOCUMENTS

| DE | 2461631 A1 | 7/1975 |
| DE | 102008038529 B3 | 11/2009 |

(Continued)

OTHER PUBLICATIONS

International Search Report for PCT/EP2018/075144 dated Nov. 14, 2018.

*Primary Examiner* — Galen H Hauth
(74) *Attorney, Agent, or Firm* — Pearne & Gordon LLP

(57) ABSTRACT

A shearing part for a plasticising screw has at least one inlet channel and at least one outlet channel, which run helically around or parallel to the longitudinal axis (X) of the shearing part. The inlet channel is open upstream and closed downstream. The outlet channel is open downstream and closed upstream. The inlet outlet channels are arranged lying directly adjacent to one another and contiguous to one another, and are connected directly with one another fluidically, so that inflowing melt can flow over directly from the inlet channel into the outlet channel, wherein a flow direction transversely to longitudinal axis (X) of the shearing part is produced. The inlet channel has a depth (T) at which shearing action on the melt is substantially avoided. The outlet channel is configured as shearing surface, so that shearing action is present onto melt flowing through the outlet channel.

10 Claims, 5 Drawing Sheets

(51) Int. Cl.
*B29C 48/395* (2019.01)
*B29C 48/68* (2019.01)
*B29K 105/12* (2006.01)

(56) References Cited

U.S. PATENT DOCUMENTS

| | | | |
|---|---|---|---|
| 5,114,658 A * | 5/1992 | Katsaros | B29C 45/0001 |
| | | | 264/537 |
| 6,962,431 B1 | 11/2005 | Luker | |
| 2009/0023223 A1 | 1/2009 | Eastwood et al. | |
| 2011/0158034 A1 | 6/2011 | Schneider | |

FOREIGN PATENT DOCUMENTS

| | | |
|---|---|---|
| EP | 0904924 B1 | 3/1999 |
| GB | 1485500 | 9/1977 |
| GB | 2111397 A | 7/1983 |
| JP | S56005748 A | 1/1981 |
| NL | 1015542 | 12/2001 |
| WO | 19860006325 A1 | 11/1986 |
| WO | 2002000416 A1 | 1/2002 |

* cited by examiner

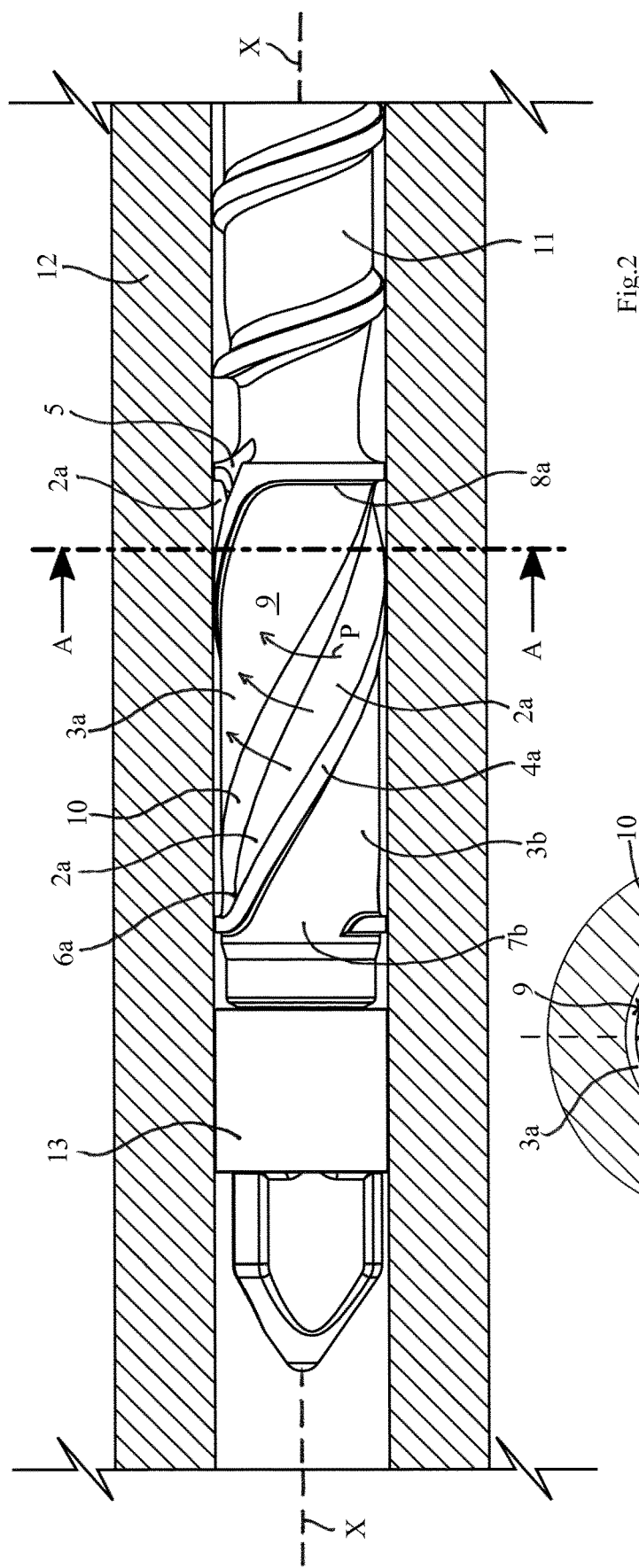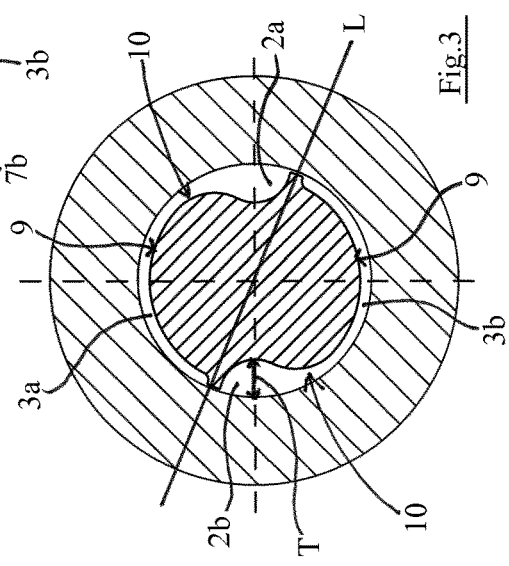
Fig.2
Fig.3

SHEARING PART

CROSS-REFERENCE TO RELATED APPLICATIONS

This is a National Stage application of PCT international application PCT/EP2018/075144 filed on Sep. 18, 2018, which claims the priority of German Patent Application No. 10 2017 124 091.8, filed Oct. 17, 2017, which are incorporated herein by reference in their entireties.

FIELD OF THE INVENTION

The invention relates to a shearing part for a screw of a plasticising unit. A preferred field of application are the processing of long fibre granulates (LFT granulates) and the processing of dry blends of chopped glass fibres and plastic. In both cases, the problem arises that accumulations of fibres can be present in the component. In LFT granulates, the fibre accumulations can be attributed to a poor wetting in the semi-finished product, in the processing of dry blends the chopped glass fibres which are used are intrinsically compact, such that they are not automatically dispersed fully within a plasticising unit. In order to prevent such fibre accumulations, also designated as fibre clusters, various embodiments of shearing parts are known from the prior art.

BACKGROUND OF THE INVENTION

In a so-called spiral shearing part, the fibre-reinforced plastic melt runs through an inlet channel with a usually semi-circular cross-section, flows over a shearing web and then flows through an outlet channel with a usually likewise semi-circular cross-section (JP-57-34936). The inlet channel has an open inlet channel start and a closed inlet channel end. By comparison, the outlet channel has a closed outlet channel start and an open outlet channel end. In other words, this means the following. The inlet channel is configured as a blind groove, in which the open end points in the direction of the upstream end of the spiral shearing part. By comparison, the outlet channel is configured as a blind groove, in which the open end points in the direction of the downstream end of the spiral shearing part.

From EP 0 904 924 A1 various embodiments are known of a screw head with grooves, which run helically around the longitudinal axis of the screw head. According to a first embodiment (FIGS. 1-5), the grooves are configured as inlet and outlet channel in the manner of a blind groove and are separated from one another by a shearing web. In a further embodiment (FIG. 6), this document discloses a screw head in which channels, configured as grooves, are provided in the surface of the screw head, which channels are open at both ends. Faces which, viewed orthogonally to the longitudinal axis of the grooves, can be configured in a wedge-shaped manner, lie parallel to these grooves and are connected fluidically with the latter (FIG. 5).

The documents WO02/00416A1 and NL1015542 belonging to a patent family disclose a shearing part in which a pair of inlet and outlet channels, configured as blind grooves, are present, wherein the open end of the inlet channels points in the direction of the rear end of the shearing part, and the open end of the outlet channels points in the direction of the front end of the shearing part. According to a first embodiment (FIGS. 5 and 6), between an inlet and an outlet channel—viewed in flow direction—there are provided firstly a shearing web with a small shearing gap and subsequently a shearing surface with a shearing gap which is enlarged compared thereto. According to a further embodiment (FIGS. 1 to 4), only one shearing surface is provided between an inlet- and an outlet channel—viewed in flow direction. In both embodiments, the inlet channel and the outlet channel have respectively a depth at which a shearing action on the melt flowing through these channels is substantially avoided. In contrast, the function of the shearing surfaces lies in that on the flowing over thereof, the melt is exposed to a shearing action. The shear deformation of a fluid element corresponds to the integral of the shear rate over the time in which a melt- or fluid element is exposed to a shearing, and can be set via the length, the width and the gap size of the shearing surface. In both embodiments, the melt runs through the inlet channel, flows over the shearing surface and subsequently flows through the outlet channel, from where the melt leaves the shearing part.

Spiral shearing parts according to the type mentioned in the introduction, i.e. with blind grooves and with a shearing web lying therebetween, which is to be flowed over by melt, are disadvantageous in the processing of fibre-filled melt in so far as during flowing over of the shearing webs, high peaks occur in the shear rate and such peaks lead to a reduction of the mean fibre length. However, there is always a desire to obtain a high mean fibre length.

As mentioned in the introduction, the formation of fibre clusters can occur in the processing of fibre-reinforced granulates. The difficulty in the disintegration of such fibre clusters consists in obtaining a high mean fibre length despite high shear deformation.

FIG. 1 shows the course of the shear rate which a fluid element of the melt undergoes during the flowing through of a shearing part. Experience has shown that peaks in the course of the shear rate, as they occur in spiral shearing parts, correlate with the reduction of the mean fibre length, while the shear deformation (=shear rate integral over the through-flow time) correlates with the extent of the disintegration of fibre clusters. For the disintegration of fibre clusters, consequently a course of the shear rate is aimed for as is represented in FIG. 1 by the dashed line and is designated by "Optimum shear course for fibre length preservation in LFT granulates."

An illustrative comparison to this is the tearing apart of cotton wool. A rapid tearing of a wad of cotton wool leads to the tearing of individual fibres in the cotton wool, whereas a slow pulling apart of the wad of cotton wool results in the untangling of the fibres and therefore the preservation of a high mean fibre lengths.

In contrast to LFT granulates, filament bundles in the case of commercially available chopped glass fibres are present compacted intensively, mixed with a binding agent and adhering strongly to one another. This is necessary for the processability, in particular the dosability, of the semi-finished products.

A shearing part according to the embodiment of FIGS. 1 to 4 of the documents WO02/00416A1 and NL1015542 indeed has the advantage that the above-mentioned effect of the slow pulling apart of fibre clusters is possible, and therefore high mean fibre lengths are preserved. Through the fact that the shearing part—viewed in cross-section (see FIG. 4 of NL1015542)—has an inlet channel, an outlet channel and a shearing surface lying therebetween, the disadvantage arises that the fibre-filled plastic melt present in the region of the shearing surface is exposed to a uniform, uniaxial shearing in the entire channel and no agitation takes place. Consequently, previously agglomerated filaments are indeed present in a dispersed manner after flowing through the shearing part, but a macroscopic homogenisation operation for the equalization of macroscale concentration fluctuations has not taken place. In particular in the processing of chopped glass fibres, such a disintegration in the upstream course of the plasticising can not be ruled out and must be compensated accordingly.

BRIEF SUMMARY OF THE INVENTION

Proceeding herefrom, the invention is based on the problem of indicating a further mixing part which is distinguished by a virtually optimum shearing course and in which the above-mentioned disadvantages are avoided.

The solution to this problem takes place through a shearing part with the features of Claim 1. Advantageous embodiments and further developments are indicated in the dependent claims.

Through the fact that the inlet channel and the outlet channel are arranged lying directly adjacent to one another and contiguous to one another, and the inlet channel, viewed in circumferential direction, continues directly into the outlet channel, wherein here the inlet channel and the outlet channel are directly connected to one another fluidically in such way that melt flowing into the inlet channel can flow over directly from the inlet channel into the outlet channel, and wherein in addition the outlet channel is configured as a shearing surface, a separate outlet channel as in the prior art according to WO02/00416A1 and NL1015542 can be dispensed with, and therefore the drag flow in the region of the shearing surface can be superimposed with an agitation.

Viewed in circumferential direction, the inlet channel continues directly into the outlet channel, wherein here the inlet channel and the outlet channel are connected directly with one another fluidically in such a way that melt flowing into the inlet channel can flow over directly from the inlet channel into the outlet channel.

In the flowing over of melt from the inlet channel into the outlet channel, a flow direction occurs which lies substantially transversely to the longitudinal axis of the shearing part.

The inlet channel has a depth at which a shearing action on the melt flowing through the inlet channel is substantially avoided, whereas the outlet channel is configured as a shearing surface in such a way that a shearing action is present on the melt flowing through the outlet channel.

The inlet and outlet channels can run helically around the longitudinal axis of the shearing part or parallel to the longitudinal axis of the shearing part (1).

According to a first embodiment, the shearing surface, viewed in radial direction of the shearing part, can have the same height over its entire extent, such that a shear gap with constant gap width is formed. A shear gap of suitable size can be set according to requirements. In the case of a comparatively large shear gap, a slow disintegrating of fibre clusters occurs through a mean shear rate over a long shearing time, and accordingly a mean shear deformation occurs. Thereby, a high mean fibre length is preserved, which has a positive effect on the mechanical characteristics of the component containing these fibres. In the case of a comparatively small shear gap, a high shear rate occurs over a long shearing time; accordingly a high shear deformation arises. This is advantageous in the processing of fibrous cut glass, because it can be better dispersed thereby.

If necessary, provision can also be made that the height of the shearing surface changes, viewed in radial and/or axial direction of the shearing part, so that a shear gap with variable gap width is present. This can be expedient for example when the flow pattern has dead points from a fluid-mechanical point of view, owing to the flow characteristics of a specific plasticate with constant shear surface height.

In further development of the invention, a rounding, in particular a founded channel boundary, can be provided between the inlet channel and the outlet channel. Such a rounding offers several advantages. On the one hand, it leads to a compression of the flow and to the production of an expansion flow. Such expansion flows lead to an improved disintegration of fibre clusters. In addition, there is no edge on which the fibres could be broken. In particular in the case of a rounding with a suitably large radius, the risk of fibre breakage can be significantly reduced. The rounding is to be configured such that the critical fibre bending radius is not fallen below.

If necessary, the channel boundary can, however, also be configured without a rounding. Depending on the cross-section of the inlet channel an acute-angled channel boundary, in particular configured in a right-angled manner, can be provided. This could, for example, be the case when not only filler agglomerates are to be distributed, but also the fillers themselves are to be broken. This is advantageous, for example, in the processing of colour masterbatches.

According to a particularly advantageous embodiment, two inlet channels and two outlet channels can be provided, wherein respectively an inlet channel and an outlet channel are connected fluidically with one another and form one half of the shearing part, wherein the two halves are arranged helically around the longitudinal axis of the shearing part and are separated from one another fluidically by barrier webs. Therefore, a pair of inlet channels, shearing surfaces and barrier webs are produced.

Through the arrangement in pairs, a pressure profile is produced which is symmetrical with respect to the screw axis. Thereby, a deflection of the shearing part or respectively of the screw out from the screw axis is prevented and therefore wear is obviated.

The cross-section of the inlet channel can be configured in a semi-circular or semi-oval manner. The advantage of a semi-circular embodiment results from the easy manufacture by means of ball end mills and a homogeneous flow profile without fluid-mechanical dead points.

Cases are also conceivable, in which a rectangular cross-section of an inlet channel can be taken into consideration, namely when a wide dwell time distribution is to be achieved.

Furthermore, the inlet channel start can preferably be configured in a funnel-shaped manner. In this way, pressure peaks at the channel inlet and the negative effects connected therewith on fibre length and process consistency can be prevented.

Preferably, the barrier web(s) can be configured in such a way that a portion is present lying parallel to the inlet channel, and that the barrier web(s) are configured at the upstream end and at the downstream end of the shearing part running in circumferential direction, in such a way that the barrier web(s) have end portions which lie orthogonally to the longitudinal axis of the shearing part. It is thereby achieved that the melt at the end of the respective inlet channel can not flow further axially to the screw tip, but rather is forced in circumferential direction onto the shearing surface. The respective inlet channel therefore has a closed inlet channel end at the downstream end of the shearing part. At the upstream end, the barrier webs are continued so that the melt can not flow directly into a shearing surface, but rather is forced into the inlet channels. Through the above-mentioned course from the barrier web(s), the following situation results at the outlet channel(s). An open outlet channel end is present at the downstream end of the shearing part, and a closed outlet channel start is present at the upstream end.

A shearing part according to the invention can come into use in particular in a single-screw plasticising unit with a cylinder and with a screw received therein. This can concern here a plasticising unit of an extrusion system, or a plasticising unit of an injection moulding machine. In the latter case, the screw is able to be driven rotatably and linearly.

A shearing part according to the invention can form the head of the screw and be preferably configured conically at its front end. It is also possible that a shearing part according to the invention is arranged spaced apart from the front end of the screw. In the latter case, optionally further conveying- or mixing zones or a backflow barrier can be arranged downstream of the screw.

BRIEF DESCRIPTION OF THE DRAWINGS

The invention is to be described further below with the aid of example embodiments and with reference to the figures.

There are shown.

DESCRIPTION OF EXAMPLE EMBODIMENTS

Figure 1:
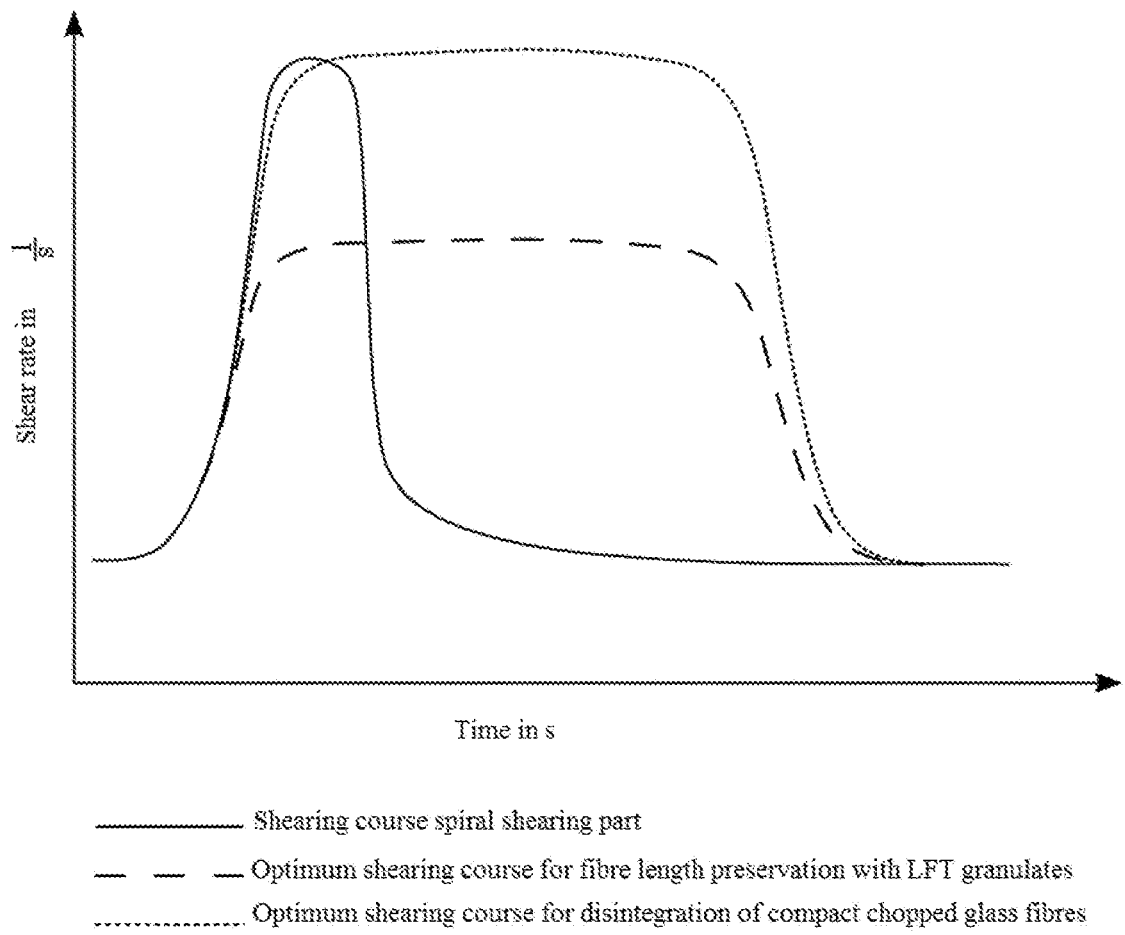
FIG. 1 course of the shear rate to which a melt fluid element is exposed with respect to time FIG. 2 shearing part according to the invention as part of a screw shaft in a cylinder FIG. 3 section along the line A-A in FIG. 2

FIG. 2 shows the use of a shearing part according to the invention at the downstream end of a screw 11, which is arranged in a rotatably and linearly driven manner in a cylinder 12. Downstream of the shearing part, a backflow barrier 13 is situated. According to FIGS. 2 and 3, a shearing part 1 according to the invention has two inlet channels 2a, 2b and two outlet channels 3a, 3b, which are respectively connected fluidically with one another and each form a half of the shearing part 1, as is indicated with the line L in FIG. 3. The two halves are arranged helically around the longitudinal axis X of the shearing part 1 and are separated from one another fluidically by barrier webs 4a, 4b. One half of the shearing part is to be described in further detail below. This comprises an inlet channel 2a and an outlet channel 3a, which run helically around the longitudinal axis X of the shearing part 1. The inlet channel 2a has an open inlet channel start 5, situated at the upstream end of the shearing part, which inlet channel start runs out in the present case in a funnel-shaped manner in upstream direction. At the downstream end of the shearing part, the inlet channel has a closed inlet channel end 6a. The outlet channel 3a has an open outlet channel end 7a at the downstream end of the shearing part and a closed outlet channel start 8a at the upstream end.

In the region between the upstream and downstream end of the shearing part 1, viewed in circumferential direction, the inlet channel 2a continues directly into the outlet channel 3a, wherein here the inlet channel 2a and the outlet channel 3a are directly connected fluidically with one another, in such a way that melt flowing into the inlet channel 2a can flow over directly from the inlet channel into the outlet channel, as is indicated by the arrows P. In the region between rear and front barrier web, the inlet channel 2a has a depth T (see FIG. 3), in which a shearing action on the melt flowing through the inlet channel is substantially avoided. The outlet channel is configured as shearing surface 9 (see FIG. 3), such that a shearing action is present onto the melt flowing through the outlet channel 3a.

At the transition 10 or respectively in the transition region 10 between the inlet channel 2a and the outlet channel 3a a rounding 10 is provided in order to avoid a break edge and in order to produce an expansion flow. The rounding can be a rounded edge or—in cross-section—can also assume different shapes as long as a critical bending radius is not fallen below, which could lead to a breaking of fibres.

Figure 5A:
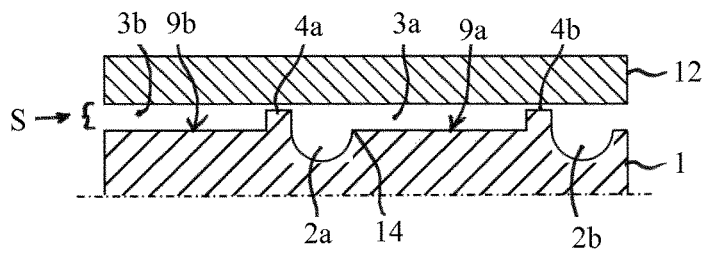
FIG. 5a section along the line B-B in FIG. 4 with semi-circular inlet channel cross-section—without rounding of the channel boundaries FIG. 5b section along the line B-B in FIG. 4 with semi-circular inlet channel cross-section—with rounding of the channel boundaries FIG. 5c section along the line B-B in FIG. 4 with rectangular inlet channel cross-section FIG. 6 flattened representation of a shearing part according to the invention with only one barrier web, one inlet channel, one outlet channel and one shearing surface FIG. 7a section along the line C-C in FIG. 6 with semi-circular inlet channel cross-section—without rounding of the channel boundaries FIG. 7b section along the line C-C in FIG. 6 with semi-circular inlet channel cross-section—with rounding of the channel boundaries FIG. 8a flow profile in a shearing part according to the invention with arrangement, in pairs, of barrier webs, inlet channels and outlet channels acting as shearing surface FIG. 8b flow profile in a shearing part in the manner of the prior art in accordance with WO02/00416A1 and NL1015542, FIGS. 1 to 4.
Figure 5B:
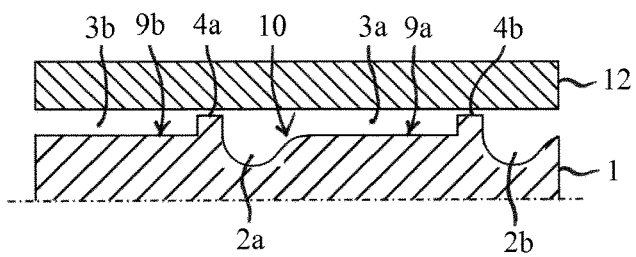
Figure 5C:
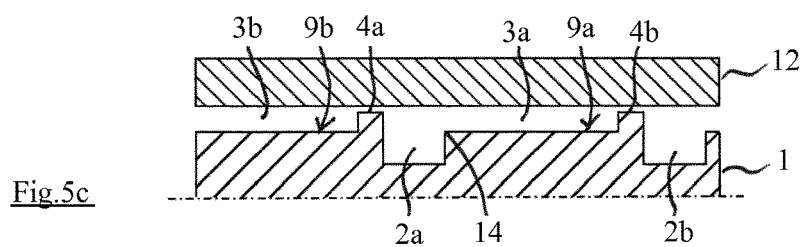

According to FIG. 3, the cross-section of the inlet channel 2a can be configured substantially in a semi-oval shape; however, it can also be configured in a substantially semi-circular shape (see FIG. 5a) or can have other cross-sections (see FIGS. 5b and 5c).

Figure 4:
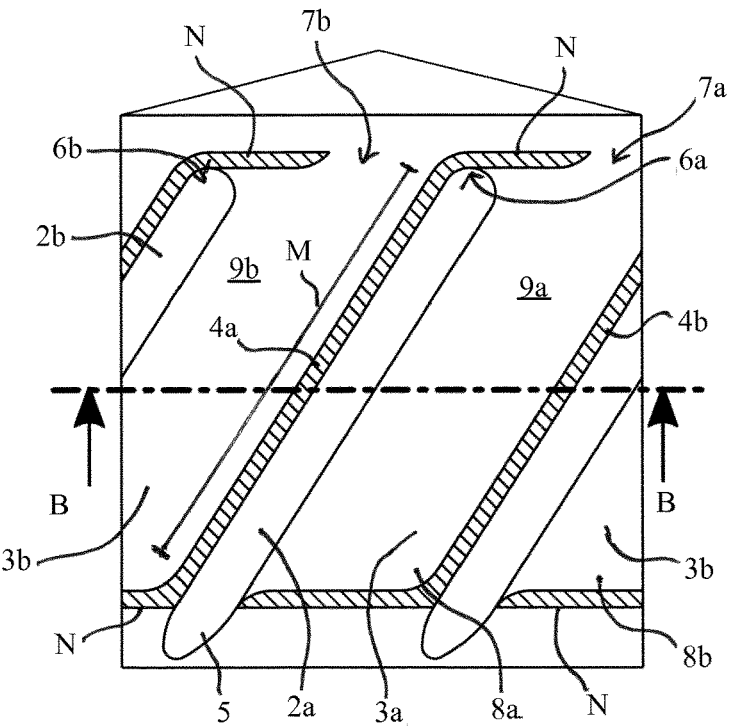
FIG. 4 flattened representation of a shearing part according to FIG. 1

FIG. 4 shows a flattened representation of the shearing part according to the invention from FIGS. 2 and 3 with an arrangement, in pairs, of two inlet channels 2a, 2b and two outlet channels 3a, 3b. Respectively one inlet channel and one outlet channel are connected with one another fluidically and form a half of the shearing part 1, wherein the two halves are arranged helically around the longitudinal axis of the shearing part 1. A first barrier web 4a is associated with the inlet channel 2a, and a second barrier web 4b is associated with the inlet channel 2b. The barrier webs are placed on the side of the respective inlet channel 2a, 2b facing away when viewed in rotation direction. Each of the barrier webs 4a, 4b is configured in such a way that it has a portion M lying parallel to the inlet channel 2a, 2b and delimiting the latter. At the upstream end of the shearing part 1 and at the downstream end of the shearing part 1, both barrier webs 4a, 4b are formed running in circumferential direction and therefore have end portions N, which lie orthogonally to the longitudinal axis X of the shearing part. Each barrier web 4a, 4b is continued in conveying direction, therefore in such a way that the melt at the end of the respective inlet channel 2a, 2b can not flow further axially to the screw tip, but rather is forced in circumferential direction onto the shearing surface 9 (see arrows P in FIG. 2). Therefore, each inlet channel at the downstream end of the shearing part has a closed inlet channel end 6a, 6b. Upstream, the barrier webs 4a, 4b are continued so that the melt can not flow directly into a shearing surface 9, but rather is forced into the inlet channels 2a, 2b. As a result, the outlet channels 2a, 2b at the downstream end of the shearing part has an open outlet channel end 7a, 7b and has at the upstream end a closed outlet channel start 8a, 8b. In total, therefore, a pair of inlet channels, outlet channels, shearing surfaces and barrier webs are produced. Through the arrangement in pairs, a pressure profile is produced which is symmetrical with respect to the screw axis X. Thereby, a deflection of the shearing part 1 or respectively of the screw 11 from the screw axis X is prevented. Consequently, the plasticising screw 11 and the shearing part 1 are exposed to a reduced wear.

FIGS. 5a to 5c show sectional illustrations along the line B-B in FIG. 4 for different embodiments of a shearing part 1 according to the invention. FIG. 5a shows a sectional illustration with a semi-circular cross-section of inlet channel 2a and inlet channel 2b. The embodiment illustrated in FIG. 5b differs from that of FIG. 5a in that at the transition from the inlet channel 2a into the outlet channel 3a a rounding of the channel boundaries 14, given reference number 10, is provided. FIG. 5c shows an embodiment with a rectangular cross-section of inlet channel 2a and inlet channel 2b and consequently with a right-angled channel boundary 14.

The embodiment according to FIG. 5b with rounding of the channel boundaries offers several advantages. On the one hand, it leads to a compression of the flow and to the production of an expansion flow. Such expansion flows lead to an improved disintegration of fibre clusters. In addition, there is no edge on which fibres could be broken. In particular with a rounding having a suitably large radius, the risk of fibre breakage can be significantly reduced. The rounding should be configured in such a way that the critical fibre bending radius is not fallen below. The embodiments according to FIGS. 5a and 5c, i.e. without rounding, can then come into use when not only are filler agglomerates to be distributed, but also the fillers themselves are to be broken. This is advantageous for example in the processing of colour masterbatches.

Viewed in radial direction of the shearing part, the shearing surface 9 can have the same height over its entire extent, such that a shear gap with constant gap width S is formed. According to requirements, a suitably large shear gap can be set.

Figure 6:
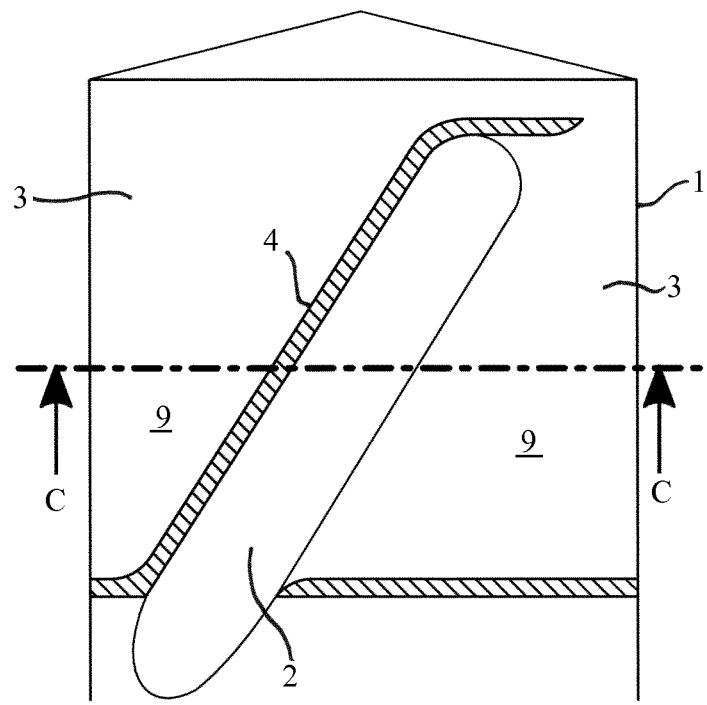
Figure 7A:
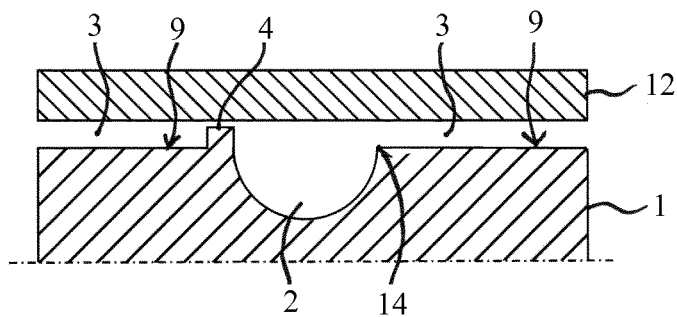
Figure 7B:
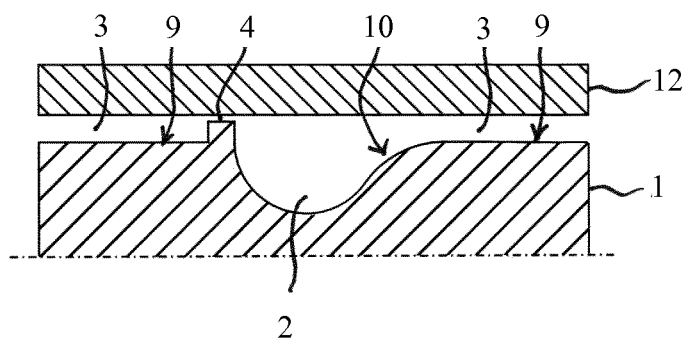

FIG. 6 shows a flattened representation of a shearing part according to the invention with only one inlet channel 2, one outlet channel 3, one shearing surface 9 and one barrier web 4. In the embodiment according to FIG. 7a, the single inlet channel 2 has a semi-circularly cross-section with an acute-angled channel boundary 14. FIG. 7b shows an embodiment with a rounding 10 of the channel boundary 14.

Figure 8A:
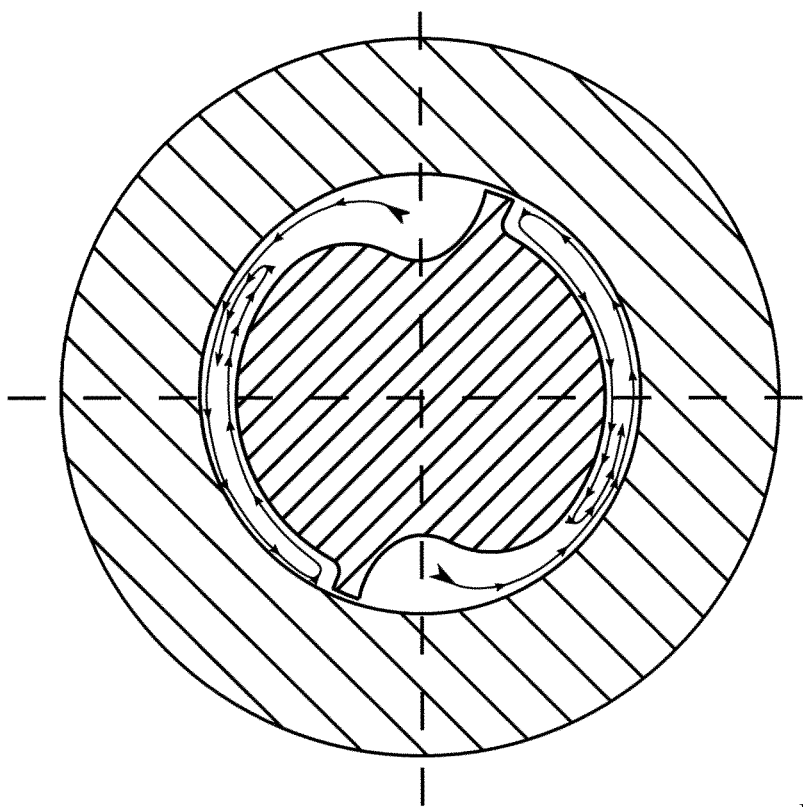

FIG. 8a shows the flow profile in a shearing part according to the invention with an arrangement, in pairs, of barrier webs, inlet channels and outlet channels acting as shearing surface.

Figure 8B:
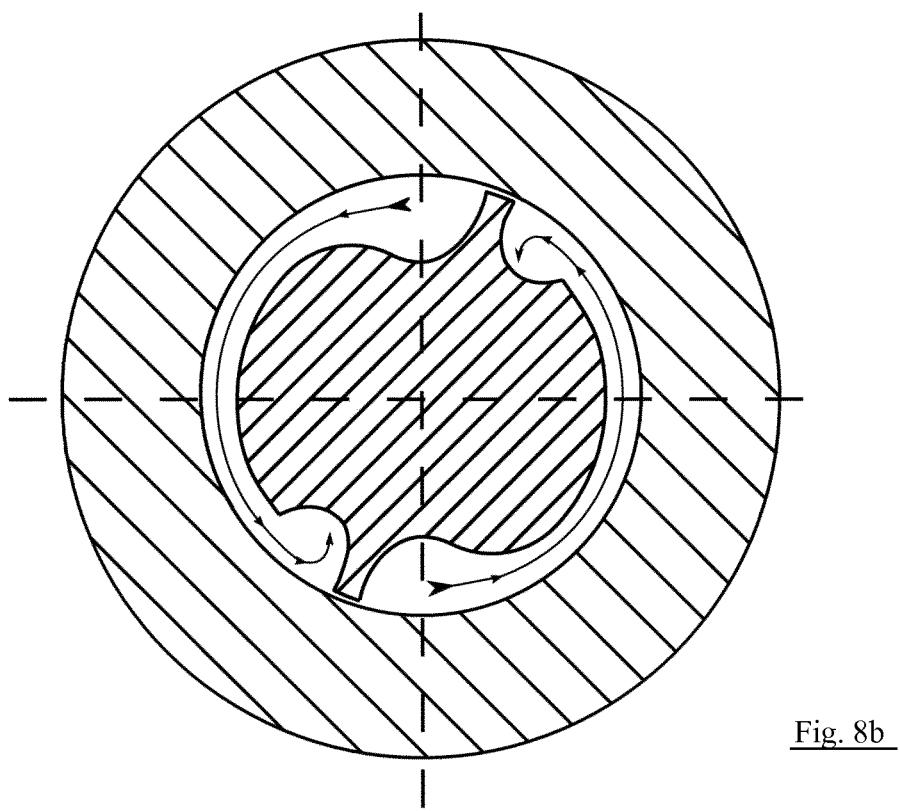

FIG. 8b shows the flow profile in a shearing part with an arrangement, in pairs, of barrier webs, inlet channels and outlet channels, wherein respectively a shearing surface is arranged between an inlet channel and an outlet channel. A shearing part of this type is known from WO02/00416A1 and NL1015542, FIGS. 1 to 4.

| Reference list | |
|---|---|
| 1 | shearing part |
| 2, 2a, 2b | inlet channels |
| 3, 3a, 3b | outlet channels |
| 4, 4a, 4b | barrier web |
| 5 | inlet |
| 6a, 6b | inlet channel end |
| 7a, 7b | outlet channel end |
| 8a, 8b | outlet channel start |
| 9, 9a, 9b | shearing surfaces |
| 10 | transition region with edge rounding |
| 11 | screw |
| 12 | cylinder |
| 13 | backflow barrier |
| 14 | channel boundary |

What is claimed is:

1. A shearing part for a plasticising screw, with at least one inlet channel, which has an open inlet channel start situated at the upstream end of the shearing part, and a closed inlet channel end situated at the downstream end of the shearing part, and with at least one outlet channel, which has an open outlet channel end situated at the downstream end of the shearing part, and a closed outlet channel start situated at the upstream end of the shearing part, wherein the at least one inlet channel and the at least one outlet channel run helically around the longitudinal axis of the shearing part or parallel to the longitudinal axis of the shearing part, wherein
the inlet channel and the outlet channel are arranged lying directly adjacent to one another and contiguous to one another, wherein the inlet channel continues directly into the outlet channel and the inlet channel and the outlet channel are fluidically connected here directly with one another, in such a way that melt flowing into the inlet channel can flow over directly from the inlet channel into the outlet channel, wherein a flow direction is produced which lies substantially transversely to the longitudinal axis of the shearing part, that the inlet channel has a depth at which a shearing action on the melt flowing through the inlet channel is avoided, and that the outlet channel is configured as shearing surface, in such a way that a shearing action is present on the melt flowing through the outlet channel,
wherein, at a transition between the inlet channel and the outlet channel, a rounding is provided comprising a rounded channel boundary that extends in a direction substantially transversely to the longitudinal axis of the shearing part.

2. The shearing part according to claim 1, wherein
the shearing surface, viewed in radial direction of the shearing part, has the same height over its entire extent, such that a shear gap with constant gap width is formed.

3. The shearing part according to claim 1, wherein
the height of the shearing surface, viewed in radial and/or axial direction of the shearing part, changes so that a shear gap with variable gap width is present.

4. The shearing part according to claim 1, wherein
two inlet channels and two outlet channels are provided, wherein respectively one inlet channel and one outlet channel are fluidically connected with one another and form a half of the shearing part, wherein the two halves are arranged helically around the longitudinal axis of the shearing part and are separated from one another fluidically by barrier webs.

5. The shearing part according to claim 1, wherein
a cross-section of the inlet channel is configured substantially in a semi-circular or semi-oval shaped manner.

6. The shearing part according to claim 1, wherein the open inlet channel start is configured in a funnel-shaped manner.

7. The shearing part according to claim 1, wherein a barrier web(s) is or respectively are configured in such a way that a portion is present lying parallel to the inlet channel, and that the barrier web (s) are configured at the upstream end and at the downstream end of the shearing part running in circumferential direction, wherein the barrier web(s) have end portions which lie orthogonally to the longitudinal axis of the shearing part.

8. A single-screw plasticising unit with a cylinder and with rotatably a linearly drivable screw received therein, wherein the screw has a shearing part according to claim 1.

9. The plasticising unit according to claim 8, wherein the shearing part forms the head of the screw, and its front end is configured conically.

10. The plasticising unit according to claim 8, wherein the shearing part is arranged spaced apart from the front end of the screw.

* * * * *